US008934218B2

(12) United States Patent
Morris

(10) Patent No.: US 8,934,218 B2
(45) Date of Patent: Jan. 13, 2015

(54) MOTOR CONTROL CENTER UNIT WITH MULTIPLE FEEDER CONFIGURATIONS

(75) Inventor: Robert Allan Morris, Fayetteville, NC (US)

(73) Assignee: Eaton Corporation, Cleveland, OH (US)

( * ) Notice: Subject to any disclaimer, the term of this patent is extended or adjusted under 35 U.S.C. 154(b) by 676 days.

(21) Appl. No.: 13/245,672

(22) Filed: Sep. 26, 2011

(65) Prior Publication Data

US 2013/0077210 A1  Mar. 28, 2013

(51) Int. Cl.
*H02B 1/04* (2006.01)
*H02B 1/36* (2006.01)

(52) U.S. Cl.
CPC ........................................ *H02B 1/36* (2013.01)
USPC ............................ 361/631; 361/627; 361/628

(58) Field of Classification Search
None
See application file for complete search history.

(56) References Cited

U.S. PATENT DOCUMENTS

| 5,466,974 | A  | * | 11/1995 | Sutrina et al. | ................... | 307/38 |
| 5,992,950 | A  | * | 11/1999 | Kumar et al. | ................. | 303/151 |
| 6,424,519 | B2 | * | 7/2002  | Soares et al. | .................. | 361/608 |
| 7,212,407 | B2 | * | 5/2007  | Beihoff et al. | ................ | 361/699 |
| 7,471,005 | B2 | * | 12/2008 | Kleen | ......................... | 290/40 B |
| 8,125,164 | B2 | * | 2/2012  | White | ............................. | 318/34 |

* cited by examiner

*Primary Examiner* — Boris Chervinsky
(74) *Attorney, Agent, or Firm* — Eckert Seamans Cherin & Mellott, LLC; Philip E. Levy; Kirk D. Houser

(57) ABSTRACT

A motor control center unit comprising multiple feeders is described. The unit may also contain a common breaker interlock release configured to lock out breakers for all of the feeders. The breakers of the multiple feeders and the breaker interlock release may be accessible and operable through an isolation cover of the motor control center unit.

24 Claims, 17 Drawing Sheets

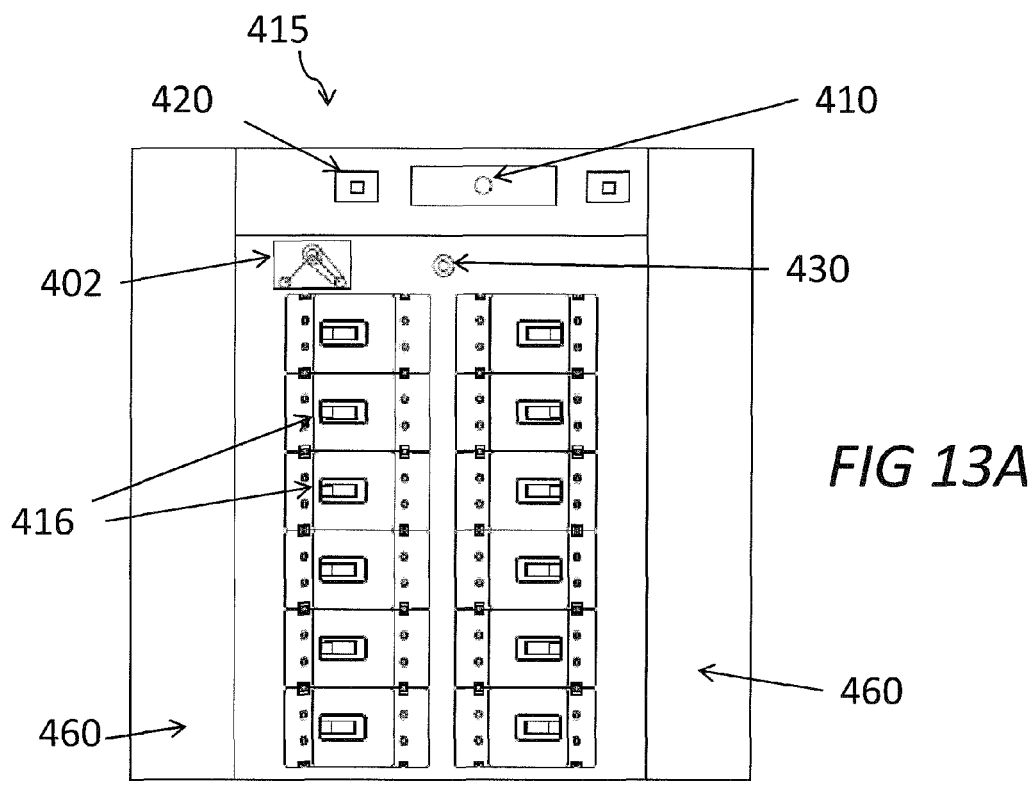
*FIG 13A*
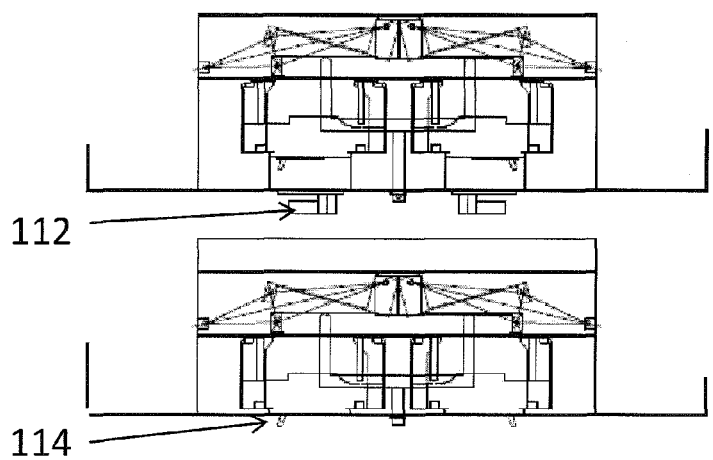
*FIG 13B*
*FIG 13C*

460

MOTOR CONTROL CENTER UNIT WITH MULTIPLE FEEDER CONFIGURATIONS

CROSS REFERENCE TO RELATED APPLICATIONS

The present application may be related to U.S. Pat. No. 7,688,572 entitled "Motor Control Center Subunit Having Moveable Line Contacts and Method of Manufacture," issuing Mar. 30, 2010 (U.S. Pat. No. 7,688,572 was assigned application Ser. No. 11/625,088, was filed Jan. 19, 2007, and claimed the benefit of U.S. provisional application No. 60/833,380, which provisional application was filed Jul. 26, 2006); and the present application may also be related to pending U.S. patent application Ser. No. 11/694,494 filed Mar. 30, 2007 and entitled "Coordinating Installation and Connection of a Motor Control Center Subunit Having Moveable Line Contacts," (U.S. application Ser. No. 11/694,494 is a continuation-in-part of U.S. Pat. No. 7,688,572); and the present application may also be related to pending U.S. patent application Ser. No. 12/708,873 filed Feb. 19, 2010 and entitled "Motor Control Center Subunit Having Moveable Line Contacts and Method of Manufacture" (U.S. application Ser. No. 12/708,873 is a continuation of U.S. Pat. No. 7,688, 572); and the disclosures of U.S. Pat. No. 7,688,572 issuing Mar. 30, 2010, and application Ser. No. 11/694,494 (filed Mar. 30, 2007) and Ser. No. 12/708,873 (filed Feb. 19, 2010) are all incorporated herein by reference in their entirety.

FIELD

The present disclosure relates to motor control centers. In particular, it relates to a motor control center unit with multiple feeder configurations.

BACKGROUND

A motor control center is a multi-compartment steel enclosure with a bus system to distribute electrical power from a common bus to a plurality of individual motor control units mountable within the compartments. The individual motor control center units are commonly referred to as "buckets" and are typically constructed to be removable modular units that have, or are installed behind, individual sealed doors on the motor control center enclosure. These units may contain various motor control and motor protection devices such as motor controllers, starters, contactor assemblies, overload relays, circuit breakers, motor circuit protectors, various disconnects, and similar devices for electric motors. The units connect to the common power bus of the motor control center and conduct supply power to a line side of the motor control devices for operation of motors and feeder circuits. Motor control centers are often used in factories and industrial facilities that utilize high power electrical motors, pumps, and other loads.

SUMMARY

According to a first aspect, a motor control center unit is described, the unit comprising a plurality of feeders adapted to supply power to a plurality of circuits and devices, wherein each feeder comprises a breaker capable of disconnecting a power flow from a line side to a load side of the feeder, the breaker configured to be positioned with the line side toward an adjacent feeder and with the load side away from the adjacent feeder such that the feeder and the adjacent feeder are adapted to share power input from a power bus and supply power to the plurality of circuits and devices connected to the left and the right of the motor control center unit, thus allowing the motor control center unit to supply power independently to the plurality of circuits and devices.

According to a second aspect, a motor control center unit is described, the unit comprising a plurality of feeders adapted to supply power to a plurality of circuits and devices, wherein each feeder comprises a breaker capable of disconnecting a power flow from a line side to a load side of the feeder, the breaker configured to be positioned in a vertical stack configuration such that feeders are adapted to share power input from a power bus from one side of the motor control center unit and supply power to the plurality of circuits and devices connected to another side of the motor control center unit, thus allowing the motor control center unit to supply power independently to the plurality of circuits and devices.

According to a third aspect, a motor control center is described, the motor control center comprising: a structure for mounting motor control center units into the center; a common power bus for supplying power to each motor control center unit; and at least one motor control center unit, wherein the motor control center unit comprises a plurality of feeders adapted to supply power to a plurality of circuits and devices, wherein each feeder comprises a breaker capable of disconnecting a power flow from a line side to a load side of the feeder, the breaker configured to be positioned with the line side toward an adjacent feeder and with the load side away from the adjacent feeder such that the feeder and the adjacent feeder are adapted to share power input from a power bus and supply power to the plurality of circuits and devices connected to the left and the right of the motor control center unit, thus allowing the motor control center unit to supply power independently to the plurality of circuits and devices.

Further aspects of the present disclosure are shown in the specification, claims and drawings of the present application.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 7A shows a front view of an exemplary MCC structure populated with MCC units with a multiple feeder configuration comprising two feeders in each unit, according to an embodiment of the present disclosure.

FIG. 7B shows a front view of an exemplary MCC structure populated with MCC units with a multiple feeder configuration comprising six feeders in each unit, according to an embodiment of the present disclosure.

FIG. 7C shows a front view of an exemplary MCC unit with two feeders, where all circuit breakers for the feeders and a common breaker interlock release operator are operable through an opening in an isolation cover.

FIG. 7D shows a front view of an exemplary MCC unit with six feeders, where all circuit breakers for the feeders and a common breaker interlock release operator are operable through an opening in an isolation cover.

FIG. 7E shows a top down cross-sectional view of an exemplary MCC unit with multiple feeder configurations and with the common breaker interlock release mechanism.

FIG. 13A-13C shows an exemplary multiple feeder MCC unit (415) in conjunction with the moveable line contacts type of unit interlock operators described in FIGS. 12A-12C.

DETAILED DESCRIPTION

Figure 1:
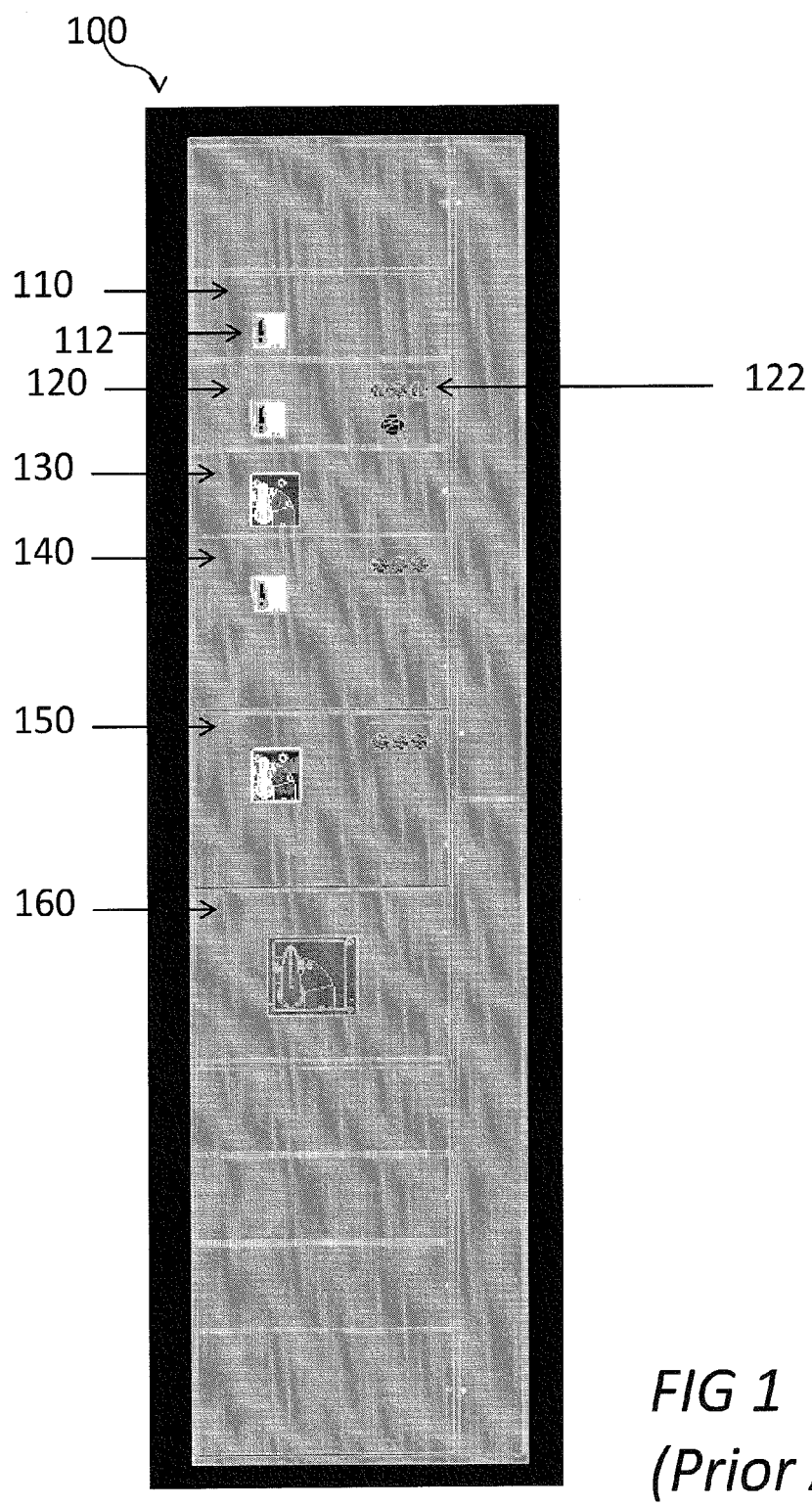
FIG. 1 shows a diagram of an exemplary motor control center (MCC) that comprises an enclosure housing a plurality of MCC units.

Typically, a motor control center (MCC), for example as shown in FIG. 1, is configured with an array of buckets, structure, or column composed of starter units (120, 140, and 150) for supplying electrical motors and pumps and also composed of general feeder units (110, 130, and 160) for supplying feeder circuits. The starter units (120, 140, and 150) may comprise a number of other motor control components.

Figure 2A:
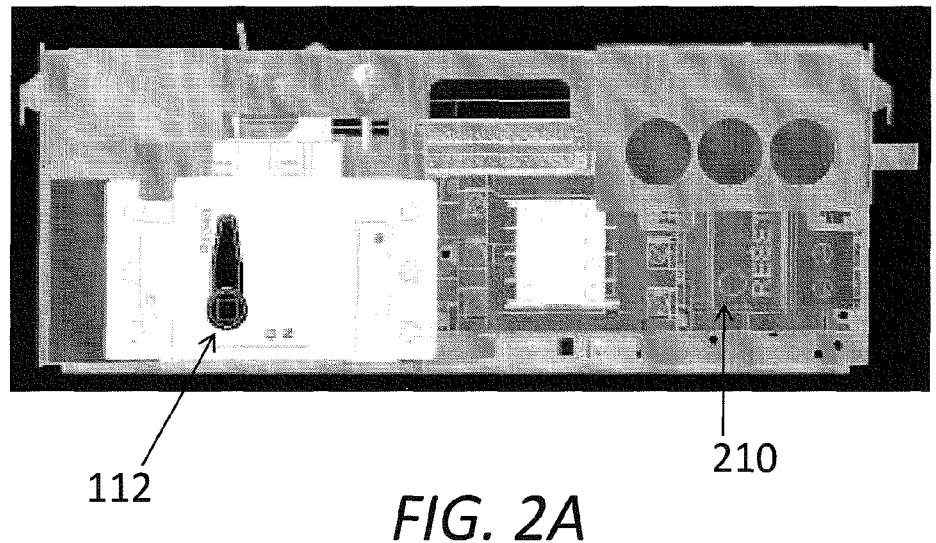
FIGS. 2A and 2B show a front and a perspective view of an exemplary starter type of MCC unit.
Figure 2B:
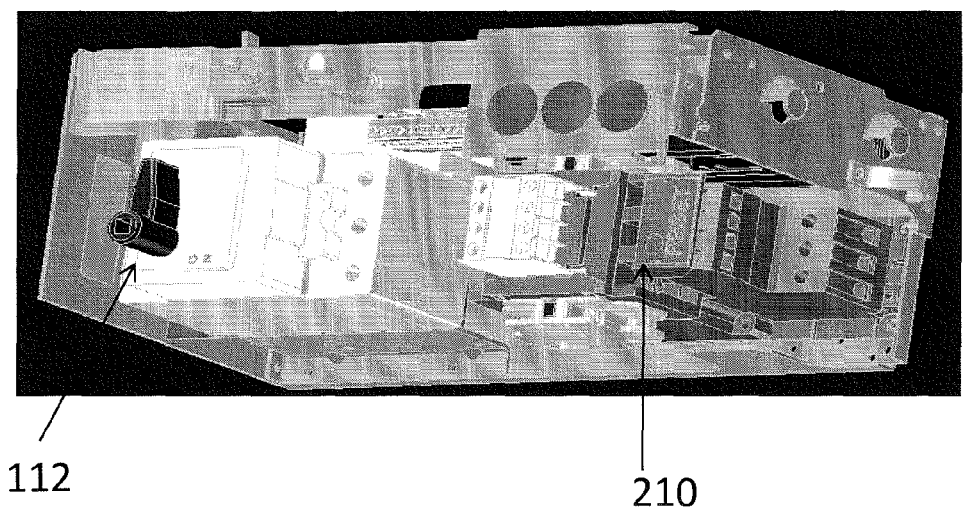

The starter units (120, 140, and 150) typically have start and stop buttons (122) associated with a motor starter, where the buttons (122) are operable through an MCC unit door as well as breaker operating handle mechanisms (112). Referring now to FIG. 2A and FIG. 2B, a front view and a perspective view of a starter unit (120 in FIG. 1) without a structure and a unit door are shown, respectively. The starter units (120 in FIG. 1) may have a fuse or circuit breaker as well as a starter that can be, by way of example, a direct line starter, a soft starter with voltage ramp mechanism, or a variable speed drive. The starter unit (120 in FIG. 1) may also have electromechanical contact or magnetic contact as well as overload relays for protecting the motor from overloading. The overload relays may be triggered manually by a reset button (210), which trips open the breaker for the starter unit (120 in FIG. 1).

The feeder units (110, 130 and 160) of FIG. 1 are noted for absence of additional motor control components and operators such as the start and stop buttons (122) in or on the units (110, 130, and 160). The feeder units (110, 130, and 160) typically house only a breaker, where the breaker or its operating handle mechanism (112) may be visible and operable with the unit door closed.

Figure 3:
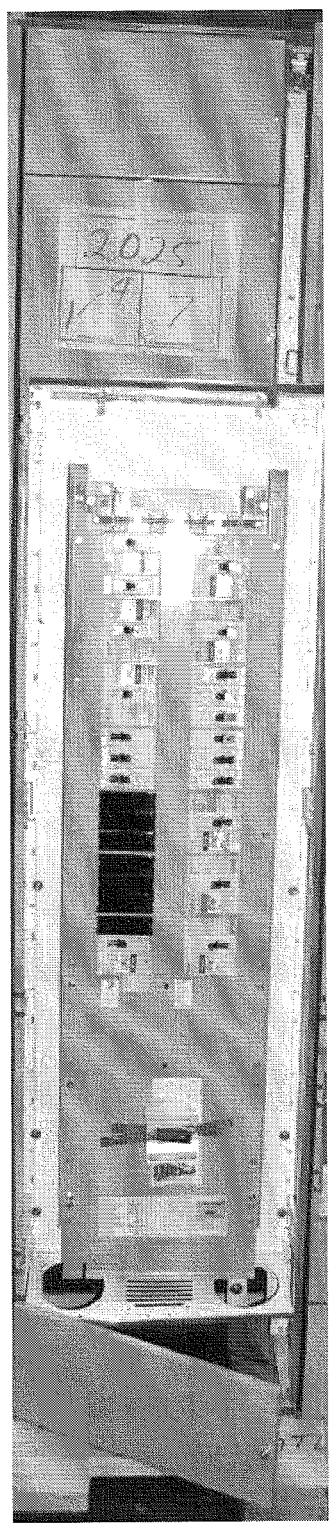
FIG. 3 shows a picture of an exemplary switchboard installed within a MCC.

In some situations, the feeder units (110, 130 and 160) that are used for supplying feeder circuits can take up several completed structures and look similar to a switchboard assembly. However, the use of feeder units (110, 130 and 160) as consolidated into an MCC may be preferred over the use of standalone switchboards or panel boards because the feeders (110, 130 and 160) in the MCC configuration can offer additional safety and convenience features such as breaker operation through the unit door (or other types of isolation covers) and enclosed cabling between units and structures. The use of MCC feeder units (110, 130 and 160) may be also preferred over hybrid solutions such as the installation of actual switchboards within MCCs as shown in FIG. 3. The hybrid configuration with a switchboard installed within an MCC structure mitigates the encasement of cabling but does not address the safety feature of breaker operation through the unit door (or other types of isolation covers).

Figure 4:
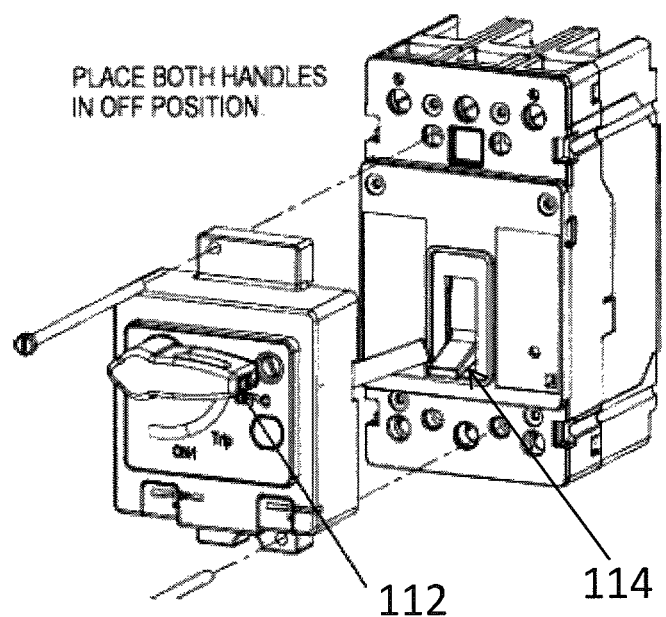
FIG. 4 shows a diagram of an exemplary breaker with an associated operating handle mechanism.

The typical feeder unit (110) as shown in FIG. 1 contains a molded case circuit breaker (MCCB or breaker) that can be operated by an operating handle mechanism (112) (see FIG. 4), commonly called the "op-mech". This op-mech (112) is an additional device that mounts atop of the breaker's integral over-toggle handle operator (114) and takes up additional space while providing additional safety and functional purposes. The op-mech (112) allows a user to operate the breaker with the doors of the motor control center units closed, for example as shown in FIG. 1 and FIG. 4, by utilizing rotary handles extending through a cutout in each motor control center unit door, thus providing a safer operating environment. As shown also in FIGS. 6A and 6B, the op-mech (112) can of other forms such as a linear operating handle.

Figure 5:
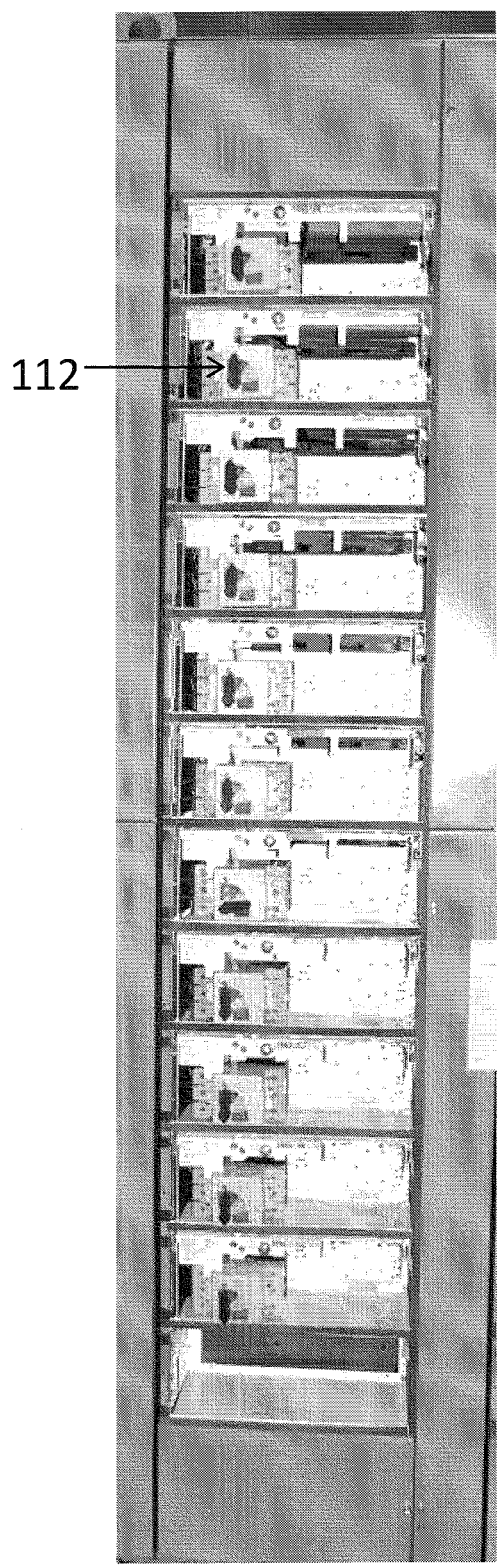
FIG. 5 shows a picture of an exemplary MCC structure fully populated by twelve MCC feeder units, where each feeder unit is shown with a breaker and each breaker is shown with an associated operating handle mechanism.

In the event of an arc or arc flash, any heated gas, flame, and/or the arc itself should preferably be contained behind the motor control center unit door such as with the op-mech (112) attachment. However, this op-mech (112) attachment can also limit number of feeders to one per unit due to space needed for the op-mech (112) arrangement as shown in FIG. 4. The single feeder unit arrangement results in an inflexibly large space requirement especially for situations where multiple feeders of the motor control center are needed to supply multiple feeder circuits. As shown in FIG. 5, a full MCC structure is required to house twelve single feeder units providing only twelve feeders.

It would therefore be desirable to design a motor control center unit that overcomes the aforementioned drawbacks. It would be desirable to provide for multiple feeders per unit without increasing the size of the unit. In addition, it would be also desirable to maintain operability of the breakers with the motor control center unit doors closed for safety.

In the present disclosure, the terms "bucket" or "unit" are used interchangeably and are intended to mean a motor control center unit that may be configured to be a removable modular unit capable of being installed behind individual or combined sealed doors on the motor control center enclosure. The unit may contain various motor control and motor protection components such as motor controllers, starters, contactor assemblies, overload relays, circuit breakers, motor circuit protectors, various disconnects, and similar devices for electric motors. The unit is configured to connect to a common power bus of the motor control center and conduct supply power to the line side of the motor control devices for operation of motors or feeder circuits.

As discussed before, units may be configured as "starter units" for supplying power controlling electrical motors and pumps or as general "feeder units" for supplying feeder circuits.

A "feeder unit" is intended to mean a motor control center unit for supplying feeder circuits. A feeder unit may have one or more feeders or power supply lines to supply feeder circuits or devices. A feeder can have a "line side", which refers to the side of the feeder configured to be directly or indirectly connected to the common power bus of the motor control center. A feeder can also have a "load side", which refers to the side of the feeder configured to be connected to and deliver current to a feeder circuit. A feeder may comprise a circuit breaker, a fuse and disconnect switch, or another configuration.

A "circuit breaker", "breaker", "molded case circuit breaker", or "MCCB" is defined as a device designed to open and close a circuit by non-automatic means (e.g., manually) and to open the circuit automatically based on a set overcurrent without damaging itself when properly applied within its current rating.

The terms "motor", "load", and "load device" are used interchangeable and are intended to mean devices bearing electrical load that are connected to and controlled by the motor control center. Load devices are typically motors but may also be pumps or other machinery that may comprise motors or pumps. Load devices may be connected to starter units.

The terms "feeder circuit" and "feeder device" are used interchangeably and are intended to mean circuits or devices connected to feeder units.

Figure 6A:
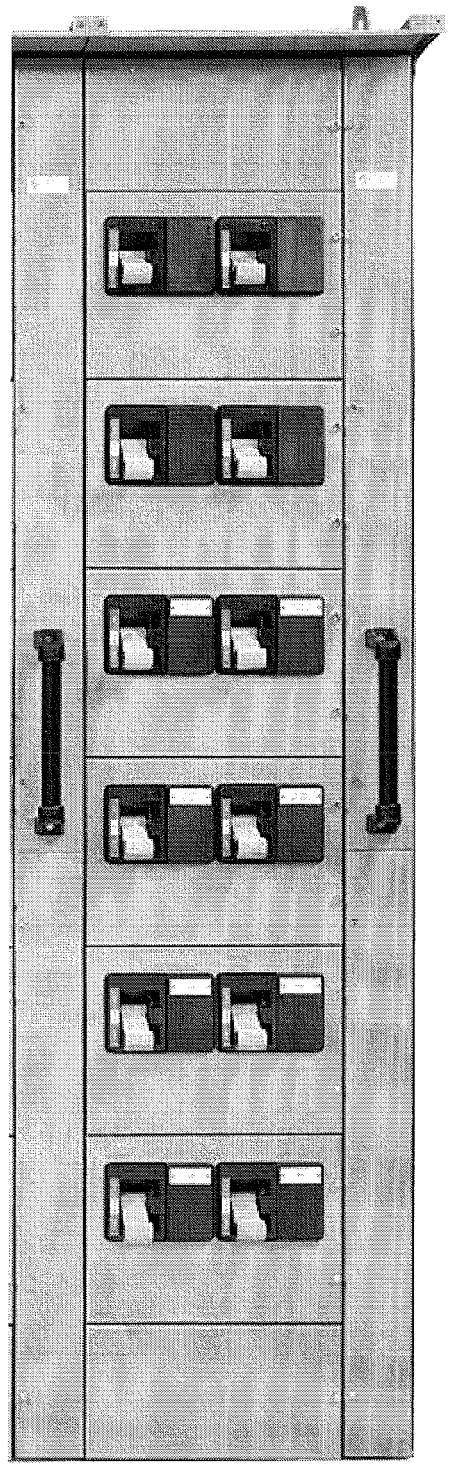
FIGS. 6A and 6B shows pictures of an MCC structure with dual feeder units where doors of the MCC units are in a closed position (6A) and an open position (6B). Breakers of the dual feeder units are operable through the door of the MCC unit using a linear operating handle integral to the breaker.
Figure 6B:
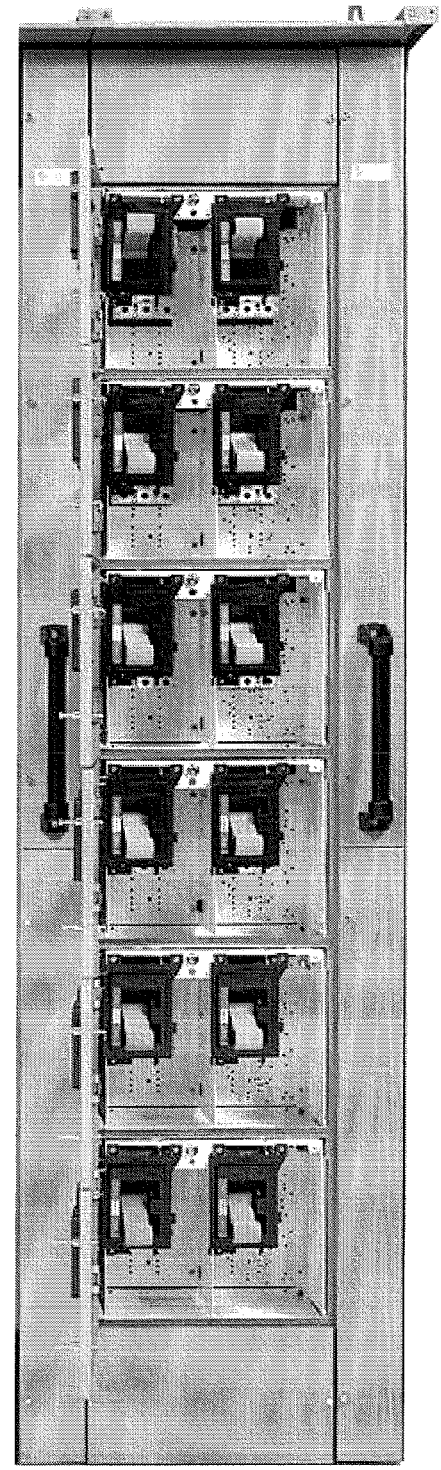

The op-mech (112) as shown in FIG. 4 may be of various forms. For example, a breaker may comprise an linear op-mech (112) which extends directly through the MCC unit door allows for operation of the breaker with the MCC unit door closed as shown in FIG. 4. FIGS. 6A and 6B each show an MCC filled with units of a dual feeder configuration, each feeder comprises a breaker with a linear form of operating handles, or op-mech (112 in FIG. 4), operable through the MCC unit doors. The exemplary configuration shown in FIGS. 6A and 6B has been used with MCC units with very large breakers rated 600A through 2000A as either a main or a feeder. Methods and systems of the present disclosure are applicable, however, to breakers of large and small sizes without the op-mech by the addition of layout and safety features.

The breakers that have op-mech (112) operable through the unit doors typically have a dual escutcheon (cover or shield) mounting face. The MCC door will have a cut out to match an inner escutcheon. An inner isolation cover may mate with an outer escutcheon such that when the MCC door is closed the op-mech (112) is operable through the opening, as shown in FIG. 6A. The inner isolation cover can provide an additional level of safety. For example, when the MCC unit door is open, the operator is still safe and isolated and from live parts with the inner isolation cover closed.

Figures 7A, 7B:
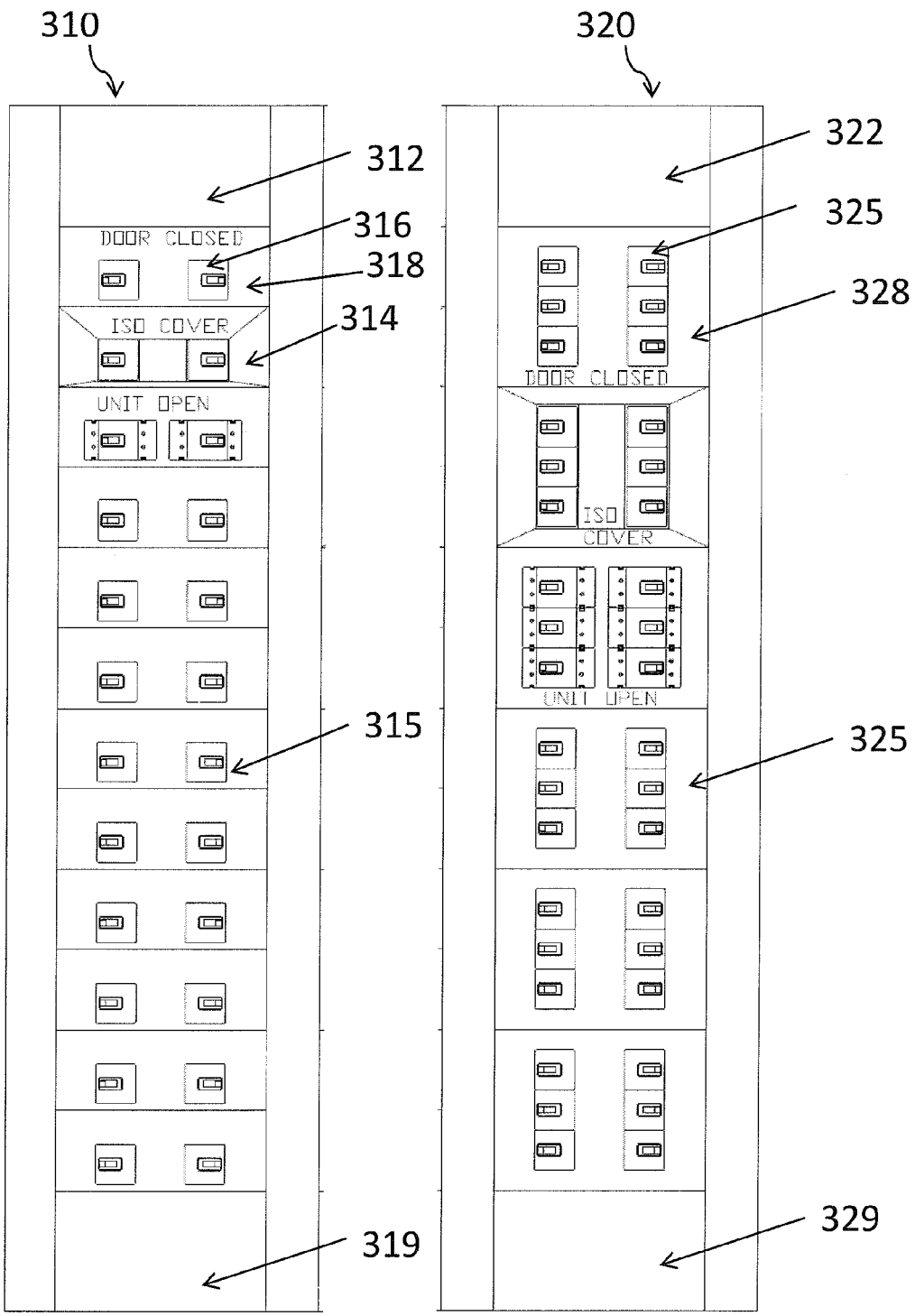
FIG. 7A-7E show exemplary configurations of multiple feeder motor control center (MCC) units according to many embodiments of the present disclosure.

FIG. 7A shows a front view of an exemplary MCC structure (310) with twelve exemplary multiple feeder MCC units (315) according to an embodiment of the present disclosure. The first compartment (312) or chamber from the top typically contains the supply power bus for the MCC. The first chamber (312) and last chamber (319) may also contain horizontal wireways for customer field connections.

The second chamber from the top shows an exemplary multiple feeder MCC unit (315), of a dual feeder configuration, in accordance with an embodiment of the present disclosure. The multiple feeder MCC unit (315) is shown with a unit door (318) in a closed position and two breakers (316) operable through the unit door (318). Each breaker (316) is associated with a respective feeder. The breakers (316) do not have any op-mech and thus require less space.

The third chamber from the top of the structure (310) of FIG. 7A shows another multiple feeder MCC unit (315) in accordance with an embodiment of the present disclosure. The multiple feeder MCC unit (315) is shown with the unit door (318) in an open position (not covering the unit and absent from the front view) and an inner isolation cover (314) closed. The isolation cover (314) is configured to offer protection for an operator handling the multiple feeder MCC unit (315) from arc events as it covers the multiple feeder MCC unit (315) during operation. A typical MCC feeder unit as shown in FIG. 5 does not have this isolation cover and does not provide this added protection. This isolation cover is a first of five possible differences between the multiple feeder MCC unit (315) of the present disclosure and the typical MCC feeder unit. The fourth chamber shows the multiple feeder MCC unit (315) with both the unit door (318) and the isolation cover (314) open and both absent from this front view, revealing the breaker (316) as also shown in FIG. 4 without any op-mech (112).

Figure 7C:
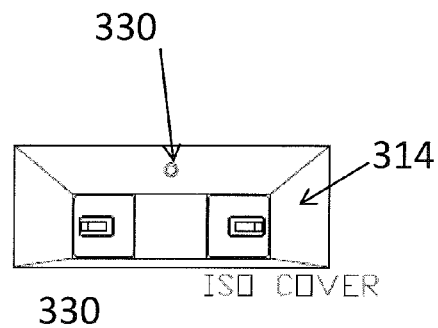
Figure 8A:
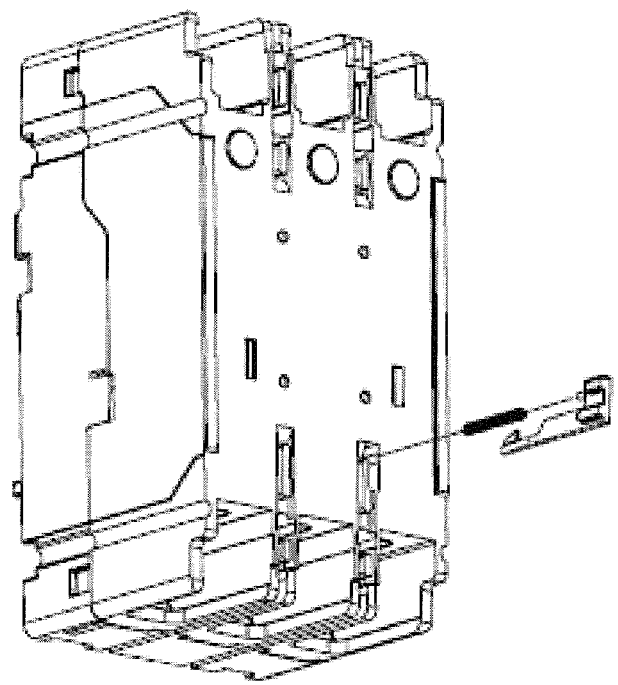
FIG. 8A shows a typical insertion point for the operation of the breaker interlock release and FIG. 8B shows detailed views of two exemplary actuators and a spring which may be utilized for the breaker interlock release of FIGS. 7C-7E.
Figure 8B:
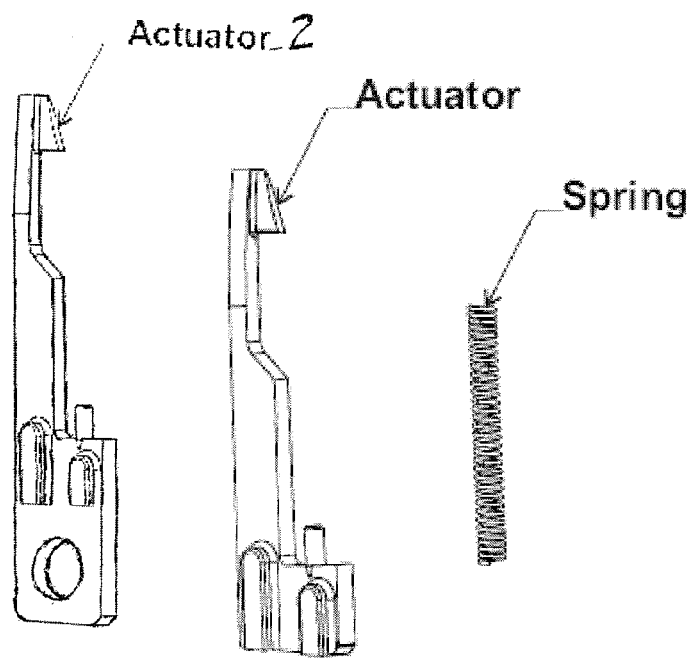

FIG. 7C shows a detailed front view of the multiple feeder MCC unit (315) with the isolation cover (314) closed. A breaker plunger interlock release operator or breaker interlock release (330) is accessible. Detailed views of exemplary actuators and a spring for breaker interlock release (330) is shown in FIG. 8B, while a typical insertion point for the operation of the breaker interlock release (330) for the breaker is shown in FIG. 8A.

The breaker interlock release (330) of the present disclosure may trip all of the breakers (316) of the multiple feeder MCC unit (315) when it is activated. The breaker interlock release (330) capable of tripping all breakers (316) of the multiple feeder MCC unit (315) and accessible through the isolation cover (314) represents a second difference between the multiple feeder unit (315) of the present disclosure and the typical MCC feeder unit as shown in FIG. 5.

This feature ensures the safety of the operator handling the multiple feeder unit (315) for operations such as its removal. In addition, the multiple feeder unit (315) can be locked in place with a unit interlock operator such as a quarter turn unit interlock. The unit interlock operator is configured to be engaged or unengaged only when the breakers (316) have all been tripped by activating the breaker interlock release (330). The unit interlock operator allows the multiple feeder unit (315) to be removed and disconnected safely from the bus.

For installation of the unit, the breaker interlock release (330) may also serve to ensure the power must be disconnected to each feeder before the unit can be installed and connected to the bus. The breakers (316) can only be closed when the unit interlock operator, such as a quarter turn interlock, of the multiple feeder unit (315) has been engaged and the multiple feeder MCC unit (315) is secured and connected to the bus, and when the breaker interlock release (330) has been unengaged. The unit interlock operator, which can be a quarter turn interlock connected to the breaker interlock release (330) via an isolator operator such as the cam action operator described in FIGS. 9A and 9B or the paddle spring operator described in FIG. 10, is a third difference between the multiple feeder MCC unit (315) of the present disclosure and the typical MCC feeder unit as shown in FIG. 5.

By way of example and not of limitation, each multiple feeder MCC unit (315) shows a configuration comprising two feeders controlled by two breakers in FIG. 7A. The two breakers (316) may be arranged with line sides, which are the sides connected to the power supply, facing each other, and the load sides, which are the sides connected to the feeder circuit, facing the MCC wireways to the right and the left sides of the structure to provide the user with a compact arrangement.

The multiple feeder configuration in accordance with an embodiment of the present disclosure, shown in FIG. 7A, differs from the typical feeder unit configuration shown in FIG. 5. The back-to-back paired configuration can save space associated with power input lines running down the center of the unit and connecting to the line side connections of the breakers facing the center of the unit. This configuration may also enable sharing of such input lines between multiple breakers (316) not only for pairs of breakers adjacent to one another but also for pairs of breakers that may stack on top of each other. Note that the wire arrangement for the multiple feeder MCC units (315) may utilize chambers to the right and left of the multiple feeder MCC units (315) to be used for vertical wireways. Connections between the feeder circuit and the load sides of the breakers (316) can be made through the MCC wireway to the left and right sides of the multiple feeder MCC unit (315) and to the left and right breakers (316), respectively. The wireways may be dedicated or shared with adjacent structures.

The back-to-back paired configuration also allows for both the right and the left side of the multiple feeder MCC unit (315) to be accessed via MCC wireways to load devices. As a result, space savings can be achieved with two breakers (316) in each multiple feeder MCC unit (315).

This use of MCC wireways on both sides of the multiple feeder MCC unit (315) and the back-to-back configuration of the breakers (316) that takes advantage of the MCC wireways from both sides of the to connect load is a fourth difference between the multiple feeder unit (315) of the present disclosure and the typical MCC configuration which that only one side, typically the right side, for vertical wireways.

The MCC structure shown in FIG. 7A with twelve multiple feeder units provides twenty-four feeder lines in a similar structure size as MCC structures utilizing the typical single feeder units as shown in FIG. 5 require for twelve feeders. Therefore, there is a net space savings in utilizing the MCC multiple feeder units of the present disclosure as only half of the feeder units are utilized in providing twelve feeders.

FIG. 7B shows a front view of an MCC structure (320) with several exemplary multiple feeder MCC units (325), where each multiple feeder MCC unit (325) comprises six breakers (326) according to another embodiment of the present disclosure. The first chamber (322) and last chamber (329) may typically contain horizontal wireways for customer field connections.

The second chamber from the top shows a multiple feeder unit (325) in accordance with an embodiment of the present disclosure. The multiple feeder unit (325) is shown with a unit door (328) in a closed position and six breakers (326) operable through the unit door (328). Each breaker (326) is associated with a respective feeder.

The third compartment shows a multiple feeder unit (325) in accordance with an embodiment of the present disclosure. The multiple feeder unit (325) is shown with the unit door (328) open and an isolation cover (324) closed. The isolation cover is configured to offer protection for the operator from arc events as it covers the multiple feeder MCC unit (325) during operation. The fourth chamber shows a multiple feeder MCC unit (325) with both the unit door (328) and the isolation cover in an open position (324) and revealing the breaker (326) of the feeder.

Each multiple feeder MCC unit (325) as shown in FIG. 7B shows a configuration comprising six breakers (326) for six feeders. As seen also in FIG. 7A, the breakers (326) are arranged in a back-to-back paired configuration where each breaker is positioned with a power input line side toward an adjacent feeder. The line sides of the pair of feeders are configured to share common wiring to the power supply. The connections for the load device to the load sides of the breakers can be made through the MCC wireway to the left and right sides of the multiple feeder unit (325) and to the left and right breakers (325), respectively.

As compared to the feeder configuration of FIG. 5, the multiple feeder configuration of FIG. 7B achieves greater space savings by providing six feeders per unit and thirty-six feeders per structure, whereas FIG. 5 shows only twelve feeders. This represents a fifth feature provided by the multiple feeder configuration of the present disclosure. This greater space savings can be attributed to the back-to-back paired configuration not found in the configuration of FIG. 5 and the stacking of three breakers to a height of two for the single breaker units results in six breakers per double height multiple feeder unit (325).

Figure 7D:
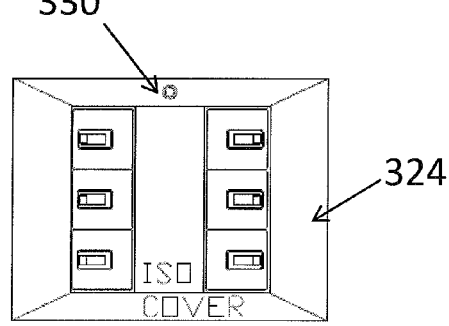
Figure 7E:
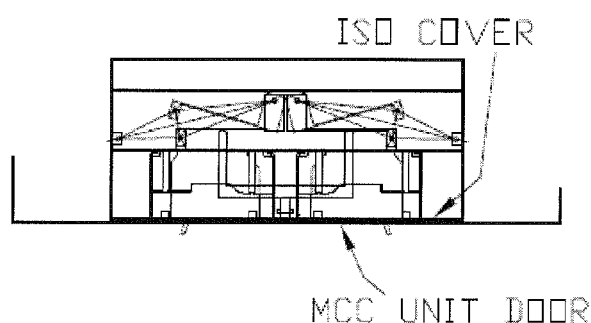

FIG. 7E shows a top-down cross-sectional view of an exemplary MCC unit (e.g., 315 in FIG. 7A or 325 in FIG. 7B) with multiple feeder configuration, a breaker interlock release (e.g., 330 in FIGS. 7C-7D), an isolation cover (e.g., 314 in FIG. 7C or 324 in FIG. 7D), and a unit door (e.g., 318 in FIG. 7A or 328 in FIG. 7B). The isolation cover can provide an additional level of safety. The isolation cover may provide isolation between the operator and live parts while giving access for the breaker interlock release (330) to be tripped. In typical operating situations, however, the breakers would be shut down before the MCC door is opened. But the presence of the breaker interlock release (330) operable with the isolation cover closed represents added safety.

The breaker interlock release (e.g., 330 in FIGS. 7C-7D) is shown with a spring configured to toggle a paddle between two states with the interlock. The toggling of the paddle can be by an isolator operator cam action between the two states.

Figure 9A:
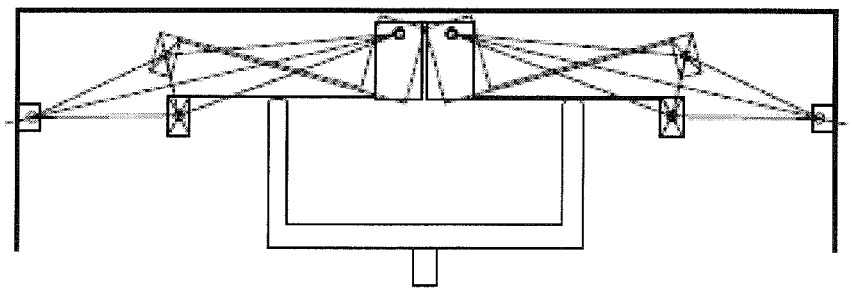
FIGS. 9A and 9B show detailed views of an exemplary spring actuator mechanism usable for the breaker interlock release of FIGS. 7C-7E.
Figure 9B:
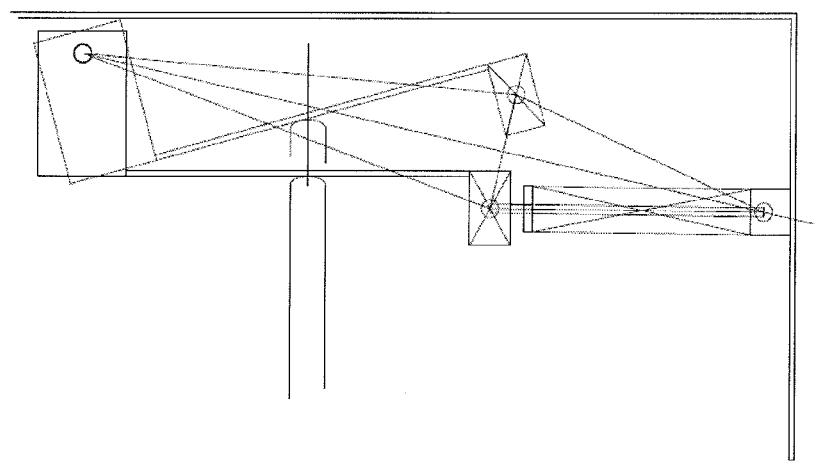
Figure 10:
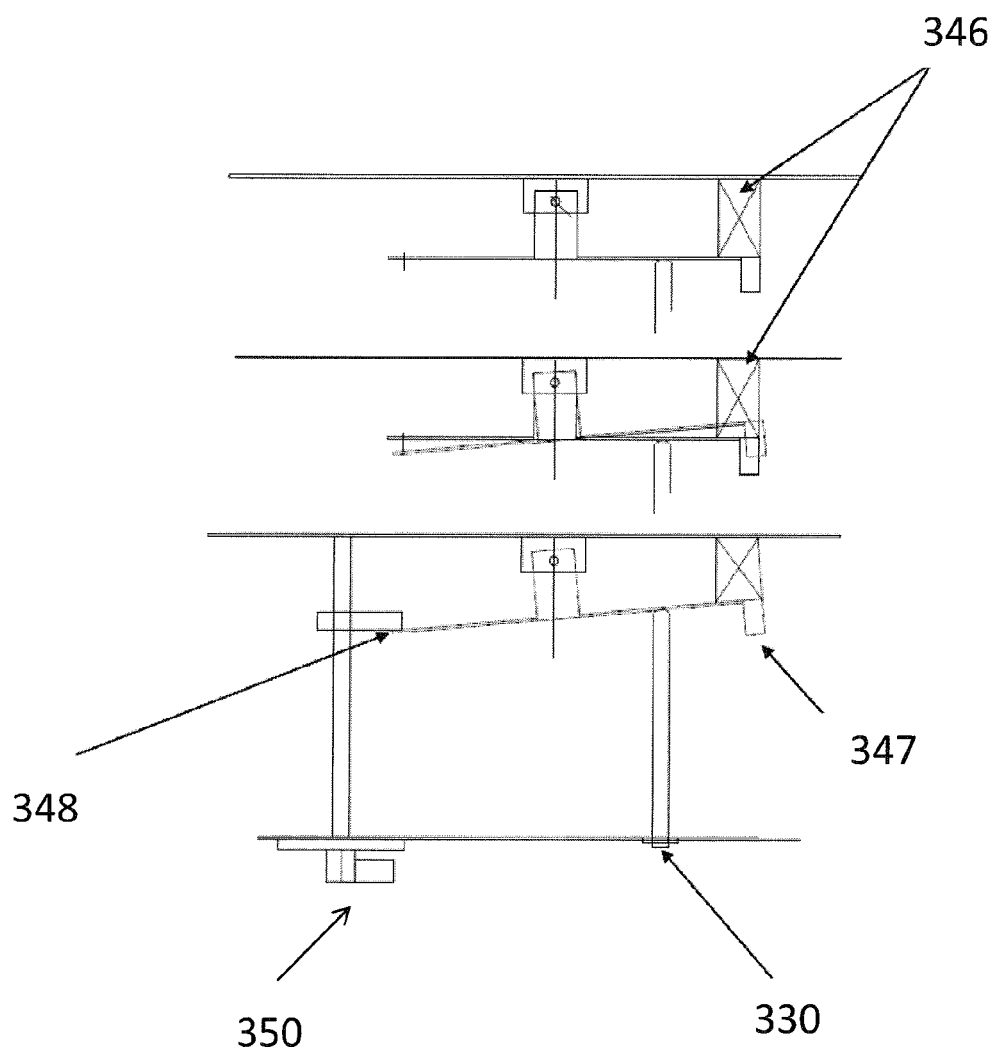
FIG. 10 show detailed views of another exemplary spring actuator mechanism usable for the breaker interlock release of FIGS. 7C-7E.

The isolator operator cam action will drive the paddle to pivot and flip between two positions by configuring a spring (340) to reach maximal compression at the center position that causes toggle to favor the two states (342, 344) over being in between (343) as shown in FIGS. 9A and 9B.

It is noted that the breaker interlock release as shown in FIGS. 7C-E and also the isolator cam action shown in FIGS. 9A and 9B represent examples of mechanical interlocks and activation mechanism useful for ensuring the breakers are open during plugging and unplugging of MCC units prior to removal or installation. The examples are intended to be illustrative and not limiting.

FIG. 10 shows another exemplary isolator operator which may be with the breaker interlock release shown in FIGS. 7C-E. FIG. 10 show an interlock spring (346) under a breaker plunger deactivation paddle (347) which also serves as point of contact. The paddle (347) and the spring (346) are configured such that as the breaker interlock release button (330) is depressed to trip the breaker, the current flow through the breaker is mechanically disabled. Further, isolator operator can also link the depression of the interlock button to release a unit interlock operator release (348) to prevent the installation or removal of the unit until the breakers are tripped by releasing, and allow the operation of, in this case, a quarter turn unit interlock operator (350) which mechanically block the unit from being inserted into the structure. Other unit interlock operators may also be used for this purpose.

The breaker interlock release (e.g., 330 in FIGS. 7C-7D), especially when used in conjunction with the quarter turn unit interlock (350) can allow for increased safety in the installation, maintenance, and operation of a multiple feeder MCC unit (e.g., 315 in FIG. 7A, 325 in FIG. 7B). For example, as shown in FIGS. 11A-11F, the quarter turn unit interlock operator (350) is shown with the isolator operator of FIG. 10. Although only one breaker is shown in each of FIGS. 11A-11F, operation of the features shown is applicable to multiple breakers.

Figure 11A:
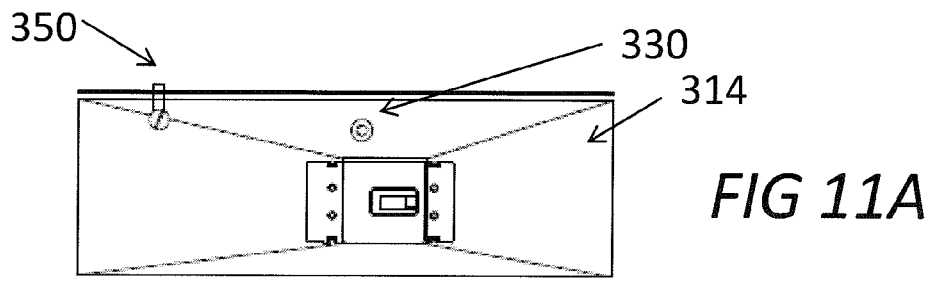
FIGS. 11A-11F show detailed front and top views of an exemplary multiple feeder MCC unit with a quarter turn unit interlock for use in conjunction with the breaker interlock release of FIGS. 7C and 7D utilizing the exemplary spring actuator mechanism of FIG. 10.
Figure 11B:
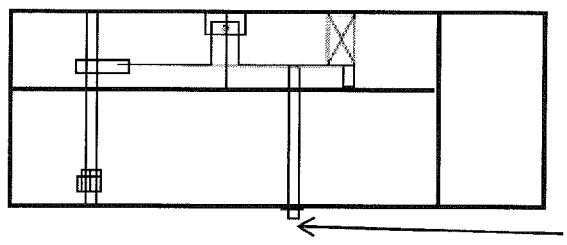
Figure 11C:
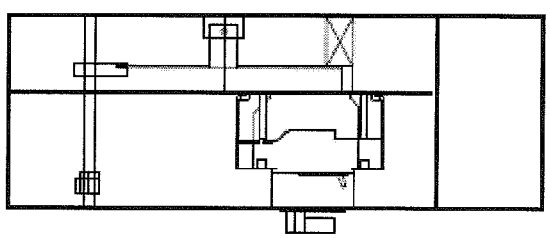

When positioned in the "up" position as shown in FIG. 11A, the quarter turn unit interlock operator (350) may block and prevent the unit from being inserted. The quarter turn unit interlock operator (350) in the "up" position may block the unit form being inserted by engaging the unit divider pan in the structure from which the unit would hang if installed. The quarter turn unit interlock operator (350) may be mechanically connected to the breaker interlock release (330). As shown in FIG. 11B, when the breaker interlock release (330) is in the "up position" the breakers may be closed as shown in FIG. 11C, but the breaker interlock release (330) keeps the quarter turn unit interlock operator (350) in the "up" position which may mechanically block the unit from being inserted in to the structure.

Figure 11D:
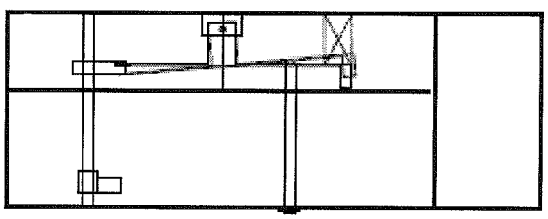
Figure 11E:
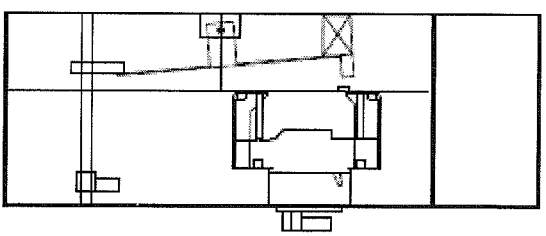
Figure 11F:
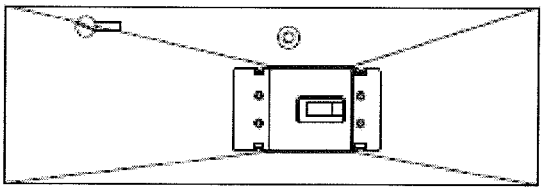

When the breaker interlock release (330) is depressed into the position as shown in FIG. 11D, the breaker(s) are opened by the breaker interlock release (330) as shown in FIG. 11E, and the quarter turn unit interlock operator (350) can be turned to the "side" or "activated" position where the interlock is no longer blocking the insertion of the unit into the structure, as shown in FIG. 11F. It is noted that FIGS. 11C and 11E an show an exemplary breaker with rotary op mech (112) on top of the breaker's integral over-toggle handle operator (114)

The use of the breaker interlock releases in conjunction with the quarter turn interlock may allow for increased safety in operating a multiple feeder MCC unit, for example, by preventing breaker from being accidentally left closed during insert or removal or during a normal MCC maintenance or operational procedure. The systematically and mechanically designed breaker interlocking systems (e.g., 330 in FIGS. 7C-7D), when used in conjunction with the quarter turn unit interlock operator (350), can prevent such known potentially dangerous conditions, thus improving operational safety and mitigate the risk of an arc flash event. The quarter turn unit interlock operator (350) is an exemplary unit interlock operator which may be used for improvement of safety in operation, installation, and de-installation of motor control center unit. Other types of unit interlock operators, such as those moveable line contacts as described in the paragraphs immediately following, may also be used.

Figure 12A:
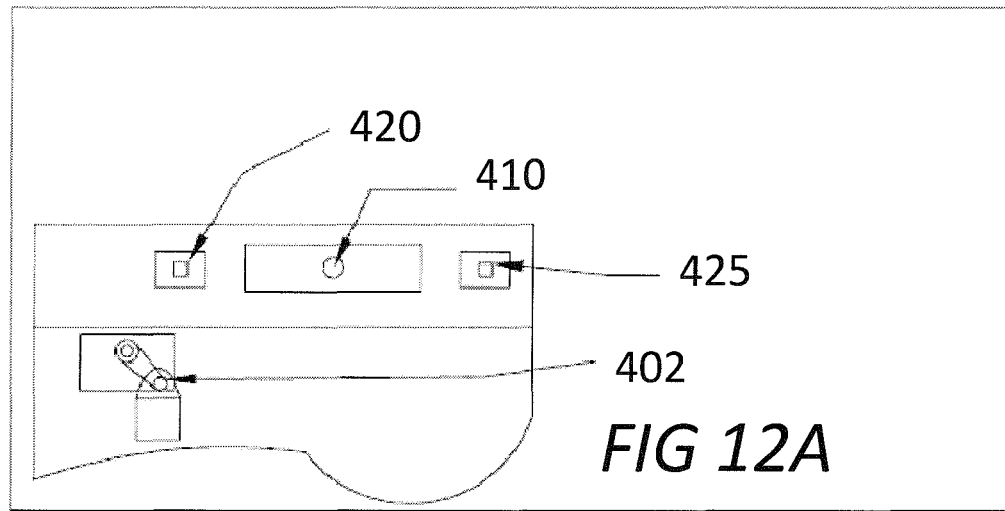
FIG. 12A-12C show front views of an exemplary MCC unit with moveable line contact type of unit interlock operator.
Figure 12B:
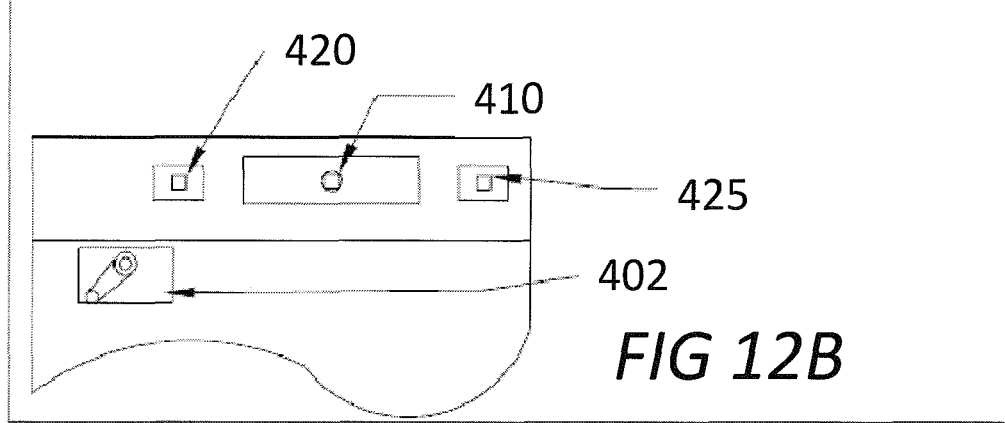
Figure 12C:
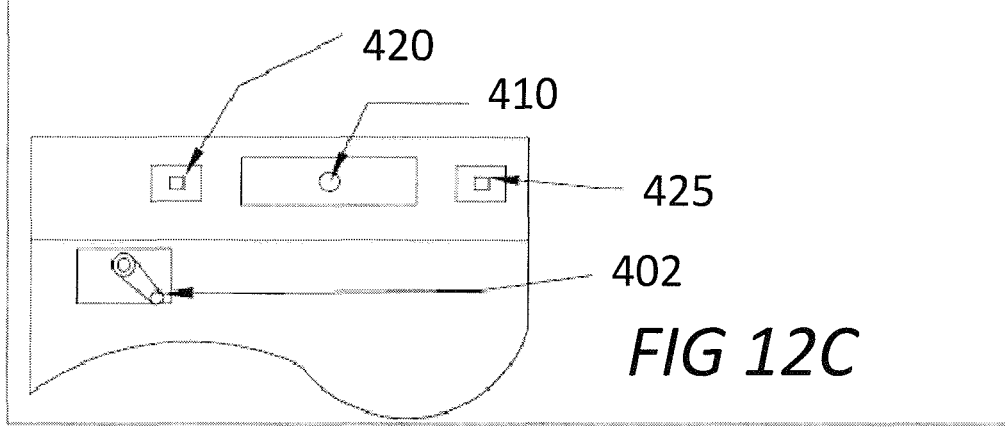

In some embodiments of the present disclosure, the multiple feeder configure may be applied to a motor control center unit with moveable line contacts as described in the above-cited U.S. Pat. No. 7,688,572 entitled "Motor Control Center Subunit Having Moveable Line Contacts and Method of Manufacture" (issuing Mar. 30, 2010), U.S. patent application Ser. No. 11/694,494 entitled "Coordinating Installation and Connection of a Motor Control Center Subunit Having Moveable Line Contacts" (filed Mar. 30, 2007), and U.S. patent application Ser. No. 12/708,873 (filed Feb. 19, 2010), the disclosures of which are incorporated herein by reference in their entirety. FIG. 12A-12C show front views of the moveable line contact type of unit interlock operators as described in the aforementioned U.S. Patent and pending patent applications.

FIG. 12A shows a front view of a motor control center unit with the moveable line contact comprising an isolator (or stab) indicator (420), an access to isolator drive (410), which may have a shutter (not shown) which may block access to the isolator drive (410), an isolator stab shutter indicator (430), and an isolator drive port operator (402). The isolator drive port operator (402) is shown in the closed position and optionally padlocked to prevent accidental changes. The isolator drive port operator (402) in the closed position prevents access to the isolator drive (410) from being operated The isolator indicator, which indicates the position of the stab, or the moveable line contact, may be indicated as green, which shows the moveable line contact (stab or isolator) is not connected to the power bus of the structure. This is a configuration which may be utilized to physically install the motor control center unit to the structure.

To continue the installation of the MCC unit, the isolator drive port operator (402) may be moved to the open position as shown in FIG. 12B and thus allowing the shutter to the access to the isolator drive (410) to be open. A drive or crank may be used in the access to the isolator drive (410) to engage the stab, or moveable contact line, and upon engagement of the stab, the isolator (or stab) indicator (420) may show a red instead of green color when the stab, or moveable conduct line, is fully connected to the vertical bus system.

Once the stab in fully engaged, the drive may be removed and the access to the isolator drive (410) closed again as shown in FIG. 12C and the isolator drive port operator (402) may be also closed again and optionally padlocked. The isolator indictor (420) would indicate red for engaged.

FIG. 13A-13C shows a MCC unit (415) with multiple feeder configuration according to an embodiment of the present disclosure in conjunction with the moveable line contacts type of unit interlock operators described in FIGS. 12A-12C. The moveable line contact type of unit interlock as described in FIGS. 12A-12C and in U.S. Pat. No. 7,688,572 and U.S. patent application Ser. No. 11/694,494 represents a first difference between the multiple feeder MCC unit (415) of the present embodiment of the present disclosure and the typical MCC feeder unit as shown in FIG. 5.

FIG. 13A Shows a detailed front view of the MCC unit with multiple feeder configuration with the unit door open. The breaker plunger interlock release operator or breaker interlock release (430) is accessible. Detailed views of exemplary actuators and a spring for the breaker interlock release (430) is shown in FIG. 8B, while a typical insertion point for the operation of the breaker interlock release (430) for the breaker is shown in FIG. 8A.

The breaker interlock release (430) of the present disclosure may trip all of the breakers (416) of the multiple feeder MCC unit (415) when it is activated. The breaker interlock release (430) capable of tripping all breakers (416) of the multiple feeder MCC unit (415) and accessible with the unit door open represents a second difference between the multiple feeder unit (415) of the present embodiment of the present disclosure and the typical MCC feeder unit as shown in FIG. 5.

FIGS. 13B and 13C shows top cross sectional views of the multiple feeder MCC unit (415) rotary operating mechanism (112 of FIG. 4) as shown in FIG. 13B and with integral over-toggle handle operator (114 of FIG. 4) as shown in FIG. 13C. The breakers (416) can only be closed when the unit interlock operator, such as the moveable line contact, of the multiple feeder MCC unit (415) has been engaged and the multiple feeder MCC unit (415) is secured and connected to the bus, and when the breaker interlock release (430) has been unengaged. The unit interlock operator, specifically the moveable line contact assembly's isolator drive port operator (402) is connected to the breaker interlock release (430) via a cam action isolator operator described in FIGS. 9A and 9B. This safety interlock may be especially useful in the installation of the MCC unit, when the breaker interlock release (430) may also serve to ensure the power must be disconnected to each feeder before the MCC unit (415) can be installed and connected to the bus. This safety interlock is a third difference between the multiple feeder MCC unit (415) of the present embodiment of the present disclosure and the typical MCC feeder unit as shown in FIG. 5.

Figure 15A:
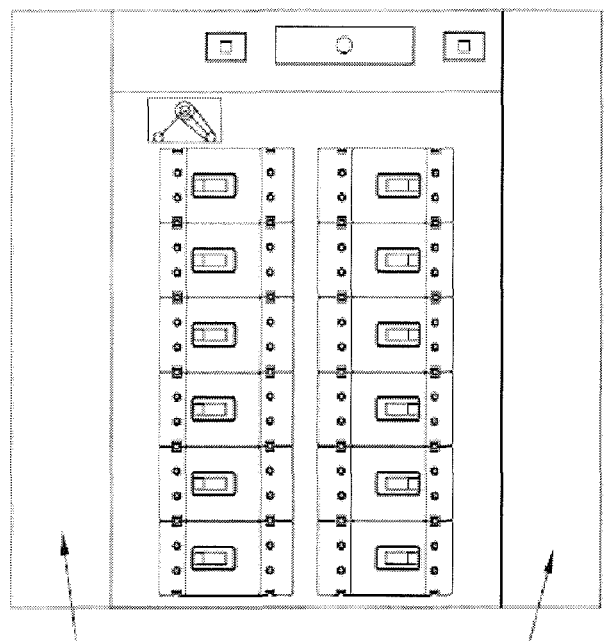
FIGS. 15A & 15B show detailed front views of an exemplary multiple feeder MCC unit dual right and left wireways.
Figure 15B:
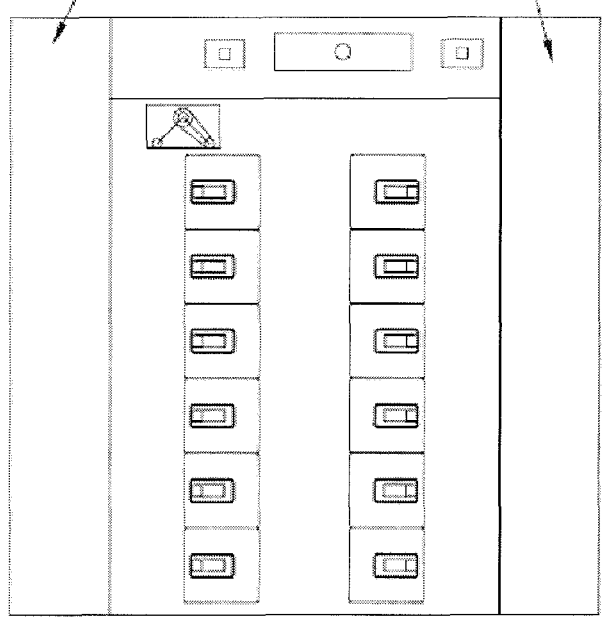

Similar to the multiple feeder MCC unit shown in FIG. 7A, FIG. 13A shows each multiple feeder MCC unit (315) shows a configuration comprising pairs of feeders controlled by pairs of breakers. The two breakers (416) in each pair may be arranged with line sides, which are the sides connected to the power supply, facing each other, and the load sides, which are the sides connected to the feeder circuit, facing the MCC wireways (460) to the right and the left sides of the structure to provide the user with a compact arrangement. As further indicated in FIGS. 15A with the unit door open and 15B with the unit door close, the right and left MCC wireways (460) can allow for a compact arrangement with multiple feeders in a smaller total space.

As in FIG. 7A, the back-to-back paired configuration can save space associated with power input lines running down the center of the unit and connecting to the line side connections of the breakers facing the center of the unit. This configuration may also enable sharing of such input lines between multiple breakers (416) not only for pairs of breakers adjacent to one another but also for pairs of breakers that may stack on top of each other. Note that the wire arrangement for the multiple feeder MCC units (415) may utilize chambers to the right and left of the multiple feeder MCC units (315) to be used for vertical wireways. Connections between the feeder circuit and the load sides of the breakers (416) can be made through the MCC wireway to the left and right sides of the multiple feeder MCC unit (415) and to the left and right breakers (416), respectively of each pair of breakers. The wireways may be dedicated or shared with adjacent structures.

This use of MCC wireways on both sides of the multiple feeder MCC unit (415) and the back-to-back configuration of the breakers (416) that takes advantage of the MCC wireways from both sides of the to connect load is a fourth difference between the multiple feeder unit (415) of the present disclosure and the typical MCC configuration which that only one side, typically the right side, for vertical wireways. As with other embodiments of this disclosure, the multiple feeder unit (415) with the back-to-back configuration of breakers can provide multiple feeders with smaller space requirement than single feeder units as a fifth feature.

Referring now to FIG. 14A-14E, shown herein is a breaker interlock release (430), that when used in conjunction with unit interlock operators such as the moveable line contacts can allow for increased safety in the installation, maintenance, and operation of a multiple feeder MCC unit (415). For example, as shown in FIGS. 14A-14E, the isolator drive port operator (402) of the moveable line contacts type of unit interlock operator is shown with the paddle and spring isolator operator of FIG. 10. Although only one breaker is shown in each of FIGS. 14A-14E, operation of the features shown is applicable to multiple breakers.

Figure 14A:
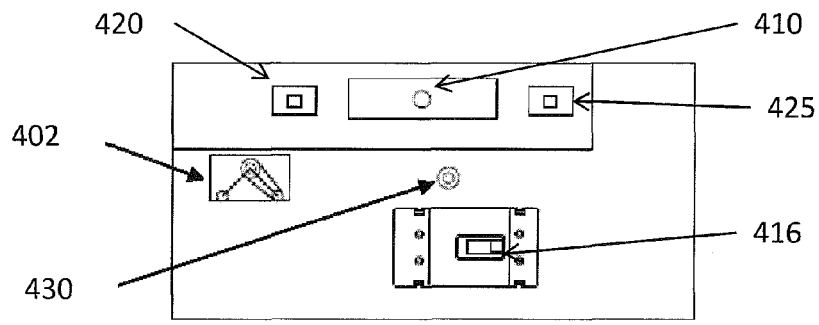
FIGS. 14A-14E show detailed front and top views of an exemplary multiple feeder MCC unit with moveable line contacts for use in conjunction with a breaker interlock release utilizing the exemplary spring actuator mechanism of FIG. 10.
Figure 14B:
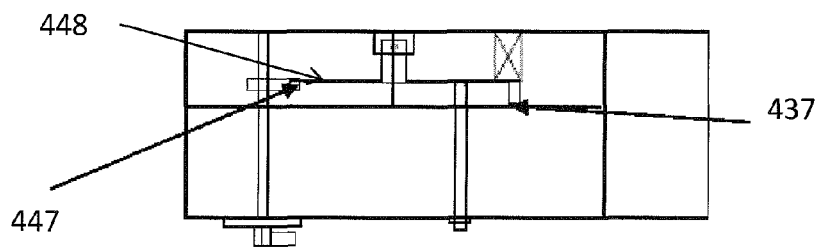
Figure 14C:
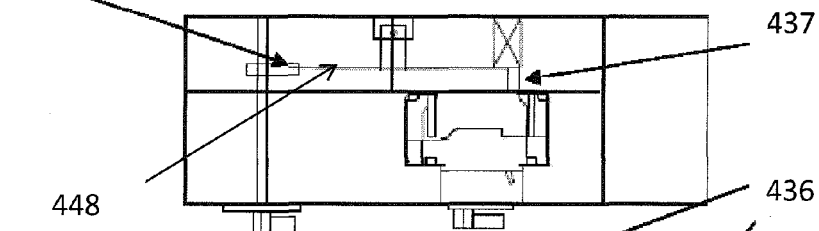

The unit interlock operator, specifically the moveable line contact assembly's isolator drive port operator (402) may be mechanically connected to the breaker interlock release (430). As shown in FIG. 14B, when the breaker interlock release (430) is in the "up position" the breakers may be closed with the point of contact between the paddle (447) and the breaker engaged as shown in FIG. 14C, but the breaker interlock release (430) keeps a unit interlock operator release (448) engaged thus mechanically preventing the isolator drive port operator (402) from opening the shutter of the isolator drive (410) thus preventing the MCC unit from being inserted to or extracted from the structure.

Figure 14D:
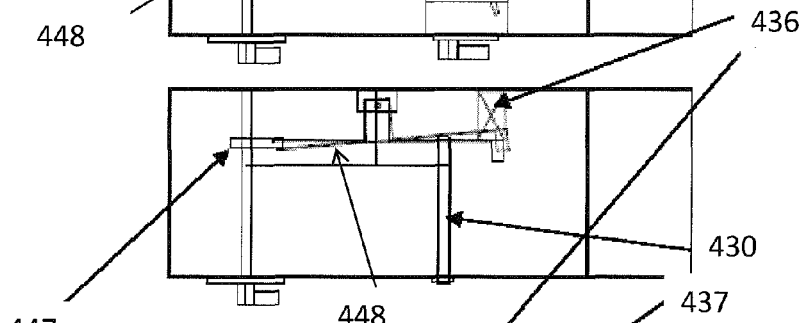
Figure 14E:
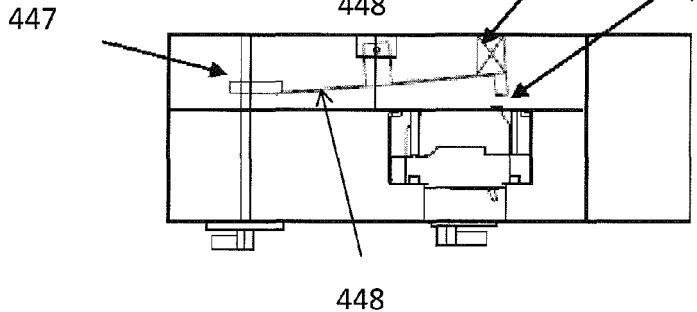

When the breaker interlock release (430) is depressed into the position as shown in FIG. 14D, a interlock spring (446) is depressed under a breaker plunger deactivation paddle (447) which also serves as point of contact for the breaker thus tripping the breaker(s) open. Further, the unit interlock operator release (448) is unengaged thus releasing the isolator drive port operator (402) to be used for opening the shutter of the isolator drive (410) and enabling the inserting to or removal from of the MCC unit with the structure.

Figure 16A:
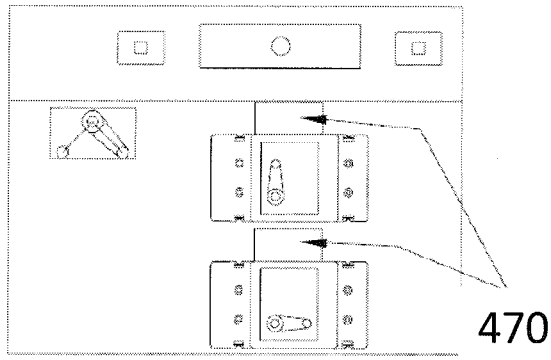
FIGS. 16A-16D show exemplary dual feeder configurations with a vertical stack instead of a back-to-back feeder arrangement.
Figure 16B:
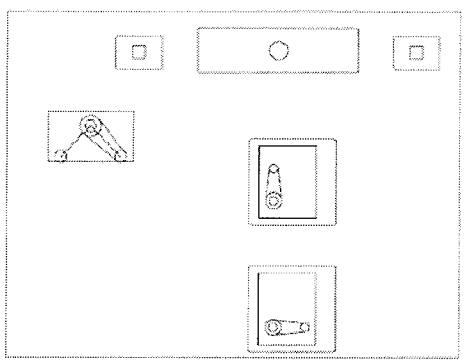
Figure 16C:
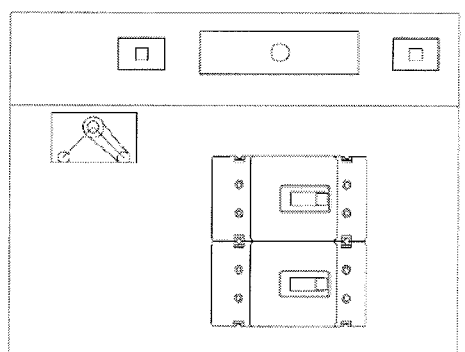
Figure 16D:
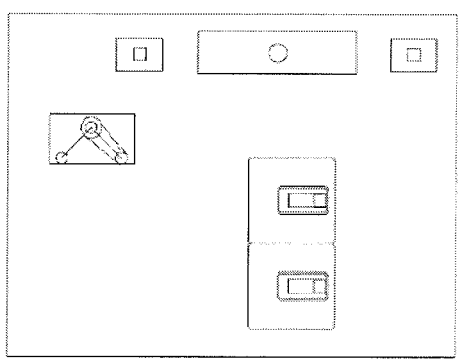

Embodiments of the multiple feeder MCC units of the present disclosure with moveable line contacts can be configured also without with a vertical stack instead of a back-to-back feeder arrangement and dual wireways. For example, FIGS. 16A-16D show dual feeder configurations without the back-to-back feeder arrangement. FIGS. 16A & 16B shows dual feeder arrangement with rotary handle op-mech (112 of FIG. 4) in a unit door open front view and a unit door closed front view. Each breaker with rotary handle op-mech (112) has a breaker door interlock area (470). FIGS. 16C & 16D shows a similar dual feeder arrangement but with the integral over-toggle handle operator (114 of FIG. 4)

The embodiments of the present disclosure describe a motor control center unit with multiple feeder configuration that can save space and potentially cost. The savings in space by placing more feeders in the same amount of motor control center unit space can reduce the total amount of steel and other metals that are utilized for the manufacturing and assembling of the motor control center components. Such reductions can result, by way of example and not of limitation, the amount of housing materials for units by utilizing less number of units for the same amount of feeders, and also perhaps utilizing a fewer number of MCCs and MCC enclosures. Such reductions can contribute to global efforts in environmentally friendly manufacturing processes. Additionally, safety of the motor control centers can be improved as a result of increased prevention of electrical arc events by the presence of the isolation cover and the breaker interlock, which prevents accidentally closed breaker settings during high risk events such as power up. The accessibility and operability of the breaker interlock drastically increases the safety of the resulting motor control center component. Therefore, the embodiments of the present disclosure may improve both the space and cost efficiency and the safety of the resulting motor control center component.

The examples set forth above are provided to give those of ordinary skill in the art a complete disclosure and description of how to make and use the embodiments of the motor control center unit with multiple feeder configurations of the disclosure, and are not intended to limit the scope of what the inventor regard as his disclosure. Modifications of the above-described modes for carrying out the disclosure may be used by persons of skill in the art, and are intended to be within the scope of the following claims. All patents and publications noted in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A motor control center unit, comprising a plurality of feeders adapted to supply power to a plurality of circuits and devices, wherein each feeder comprises a breaker capable of disconnecting a power flow from a line side to a load side of the feeder, the breaker configured to be positioned with the line side toward an adjacent feeder and with the load side away from the adjacent feeder such that the feeder and the adjacent feeder are adapted to share power input from a power bus and supply power to the plurality of circuits and devices connected to the left and the right of the motor control center unit, thus allowing the motor control center unit to supply power independently to the plurality of circuits and devices.

2. The motor control center unit of claim 1, further comprising a unit door adapted to have an open position and a closed position, wherein each breaker is operable by integral over-toggle handle operator through an opening in the unit door when the unit door is in a closed position.

3. The motor control center unit of claim 2, further comprising an isolation cover adapted to have an open position and a closed position and adapted to serve as protection for an operator of the motor control center unit, wherein each breaker is operable by an integral over-toggle handle operator through an opening in the isolation cover when the isolation cover is in a closed position.

4. The motor control center unit of claim 1, further comprising a common breaker interlock release, wherein the common breaker interlock release is adapted to:
open all breakers of the motor control center unit by depressing one button;
lock down a unit interlock operator, thus keeping the unit interlock operator from releasing the motor control center unit and preventing removal of the motor control center unit while any of the breakers are closed; and
prevent any breaker in the motor control center unit from closing until a unit interlock operator release is engaged and the motor control center unit is securely connected to the power bus.

5. The motor control center unit of claim 4, further comprising a unit door, wherein the breakers and breaker interlock release are operable by an integral over-toggle handle operator through one or more openings in the unit door when the unit door is in the closed position.

6. The motor control center unit of claim 4, further comprising an isolation cover, wherein the breakers and breaker interlock release are operable by an integral over-toggle handle operator through one or more openings in the isolation cover when the isolation cover is in the closed position.

7. The motor control center unit of claim 4, wherein the unit interlock operator is a quarter turn unit interlock operator.

8. The motor control center unit of claim 4, wherein the unit interlock operator is an isolator drive port operator for a moveable line contacts system of unit isolation.

9. A motor control center comprising:
a structure for mounting motor control center units into the center;
a common power bus for supplying power to each motor control center unit; and
at least one motor control center unit, wherein the motor control center unit comprises a plurality of feeders adapted to supply power to a plurality of circuits and devices, wherein each feeder comprises a breaker capable of disconnecting a power flow from a line side to a load side of the feeder, the breaker configured to be positioned with the line side toward an adjacent feeder and with the load side away from the adjacent feeder such that the feeder and the adjacent feeder are adapted to share power input from a power bus and supply power to the plurality of circuits and devices connected to the left and the right of the motor control center unit, thus allowing the motor control center unit to supply power independently to the plurality of circuits and devices.

10. The motor control center of claim 9, further comprising a unit door adapted to have an open position and a closed position, wherein each breaker is operable by an integral over-toggle handle operator through an opening in the unit door when the unit door is in a closed position.

11. The motor control center of claim 10, wherein each motor control center unit further comprising an isolation cover adapted to have an open position and a closed position and adapted to serve as protection for the operator of the motor control center unit, wherein each breaker is operable by an integral over-toggle handle operator through an opening in the isolation cover when the isolation cover is in a closed position.

12. The motor control center of claim 9, wherein each motor control center unit further comprising a common breaker interlock release, wherein the breaker interlock release is adapted to:
open all breakers of the motor control center unit by depressing one button;
lock down a unit interlock operator, thus keeping the unit interlock operator from releasing the motor control center unit and preventing removal of the motor control center unit while any of the breakers are closed; and
prevent any breaker in the motor control center unit from closing until a unit interlocked operator release is engaged and the motor control center unit is securely connected to the power bus.

13. The motor control center of claim 12, wherein each motor control center unit further comprising an isolation cover, wherein the breakers and breaker interlock release are operable through one or more openings in the unit door when the unit door is in the closed position.

14. The motor control center of claim 12, wherein each motor control center unit further comprising an isolation cover, wherein the breakers and breaker interlock release are operable through one or more openings in the isolation cover when the isolation cover is in the closed position.

15. The motor control center of claim 12, wherein the unit interlock operator is a quarter turn unit interlock operator.

16. The motor control center of claim 12, wherein the unit interlock operator is an isolator drive port operator for a moveable line contacts system of unit isolation.

17. A method of installing a motor control center unit into a motor control center, the method comprising:
  providing the motor control center with a structure adapted for accepting motor control center units, the structure comprising at least one open chamber adapted for accepting installation of a motor control center unit and a common power bus adapted to supply power to motor control center units installed in the open chamber, the common power bus in the off state;
  providing the motor control center unit according to claim 4;
  setting all breakers on the motor control center unit to be open by engaging the breaker interlock release;
  inserting the motor control center unit into the open chamber;
  locking the motor control center unit into the structure of the motor control center with a unit interlock operator connected to the breaker interlock release and adapted to ensure all of the breakers of the motor control center unit are open when a unit power bus of the motor control center unit connects to a common power bus of the motor control center;
  connecting circuits or devices to one of more of the multiple feeders; connecting the power bus of the motor control center unit to the common power bus of the motor control center;
  turning on the common power bus of the motor control center; and
  closing each breaker for each feeder connected to a circuit or device, such that power is supplied by the feeder to the circuit or device, thus installing the unit with multiple feeder configuration into the motor control center.

18. The method according to claim 17, wherein the unit interlock operator is a quarter turn unit interlock that is prevented from turning until the breaker interlock release is engaged and all breakers in the unit are open.

19. The method according to claim 17, wherein the unit interlock operator is an isolator drive port operator of a moveable line contacts system that is prevented from turning, thus preventing access to the isolator drive port until the breaker interlock release is engaged and all breakers in the unit are open.

20. A method of uninstalling a motor control center unit from a motor control center, the method comprising:
  providing the motor control center comprising at least one motor control center unit with a multiple feeder configuration according to claim 4 installed in a structure, and a common power bus adapted to supply power to each unit, the common power bus in the off state;
  selecting a motor control center unit to be uninstalled;
  setting all breakers on the motor control center unit to be uninstalled to be open by engaging the breaker interlock release;
  disconnecting the power bus of the motor control center unit from the common power bus of the motor control unit;
  disconnecting circuits or devices from each of the one of more of the multiple feeders of the motor control center unit;
  unlocking the motor control center unit from the structure of the motor control center with a unit interlock operator connected to the breaker interlock release and adapted to ensure all of the breakers of the motor control center unit are open before a unit power bus of the motor control center unit connects to a common power bus of the motor control center; and
  removing the motor control center unit from the structure, thus uninstalling the motor control center unit from the motor control center.

21. The method according to claim 20, wherein the unit interlock operator is a quarter turn unit interlock that is prevented from turning until the breaker interlock release is engaged and all breakers in the unit are open.

22. The method according to claim 21, wherein the quarter turn unit interlock engages the unit divider pan and prevents the insertion or removal of the unit until the breaker interlock release is engaged and all breakers in the unit are open.

23. The method according to claim 20, wherein the unit interlock operator is an isolator drive port operator that is prevented from turning, thus preventing access to the isolator drive port until the breaker interlock release is engaged and all breakers in the unit are open.

24. The method according to claim 23, wherein the isolator drive port operator prevents the opening of a shutter to the isolator drive port thus prevents the insertion or removal of the unit until the breaker interlock release is engaged and all breakers in the unit are open.

* * * * *